United States Patent

Pearman et al.

Patent Number: 5,167,395
Date of Patent: Dec. 1, 1992

[54] AUTOMOBILE BATTERY LOCKING DEVICE

[76] Inventors: Leo A. Pearman, 14950 Mulberry Dr., Apt. D2, Whittier, Calif. 90604; Harlan L. Vague, 9040 Burke St., Apt. 29, Pico Rivera, Calif. 90660

[21] Appl. No.: 651,587

[22] Filed: Feb. 6, 1991

[51] Int. Cl.⁵ .................... F16M 13/00; E05B 73/00
[52] U.S. Cl. .................................. 248/551; 248/500; 180/68.5
[58] Field of Search ............... 248/551, 552, 553, 500, 248/503, 505, 507, 508, 509; 108/68.5; 180/68.5

[56] References Cited

U.S. PATENT DOCUMENTS

| | | | |
|---|---|---|---|
| 2,947,373 | 8/1960 | Wilson | 248/503 |
| 3,125,177 | 3/1964 | Paller | 248/503 |
| 3,199,624 | 8/1965 | Burns | 248/503 |
| 3,651,883 | 3/1972 | Aldag | 248/503 |
| 3,994,043 | 11/1976 | Gurzenda | 248/551 |
| 4,535,863 | 8/1985 | Becker | 248/154 |

*Primary Examiner*—Reinaldo P. Machado
*Attorney, Agent, or Firm*—Ronald L. Juniper

[57] ABSTRACT

This a means for locking an automobile battery to its mounting plate so that it can't easily be stolen. It includes a special block and hardened material which serves to lodge a mounted battery in place against its mounting plate. A bolt is secured through this block to the mounting plate. The bolt has a head formed with a variably configured female locking receptacles which fits down in a recessed opening in the top of the block. A key male piece can be matingly received in this female head so that the attached bolt can be turned to lock or release the battery. The key can be removed and the recessed head becomes inaccessible for security of the battery.

9 Claims, 1 Drawing Sheet

5,167,395

AUTOMOBILE BATTERY LOCKING DEVICE

BACKGROUND OF THE INVENTION

Automobile battery theft has become a significant problem which is a value loss, personal nuisance and security risk should a person become stranded in a dangerous area.

This is because automobile batteries are held in place, and fastened to a shallow metal plate upon which the battery rests, by means of a three or four inch piece of material is placed and screwed into the metal plate holding the battery.

With this arrangement the automobile battery is easily accessible to any thief with a standard socket or other type of wrench. Accordingly there is a need for a theft prevention mechanism which is the purpose of this in invention.

SUMMARY OF THE INVENTION

In order to solve the battery theft problem this invention provides a special new structure for holding the automobile battery in place.

It includes a specially structured piece of hard material for a bolt to battery case plate securing seat. This piece of hard material is a block having a hole therethrough sufficiently large enough to receive a battery securing bolt. The hole, in turn, is provided with an enlarged, deeply recessed top opening which is sufficiently large enough to receive a special head of the securing bolt.

The special head on the securing bolt is less than the thickness of the depth of the recessed opening to the hole in the block so that it is recessed therein when the bolt is inserted through the hole in the block.

On the top of the bolt head is the female portion of a locking system which includes predetermined configurations of holes, squares, slots or the like.

The male portion of this locking system is a piece of material which has prongs on its bottom configured to mate with the female portion of the bolt head. It is detachable but locks strongly enough into the female bolt head that it can turn the bolt when inserted therein, thus serving as a key. A lock-engaging head is on the top of this male piece which is of a standard wrench engaging shape so that it can be gripped by a wrench and turn the female headed bolt when engaged thereto.

The securing bolt retains an engaged battery in position on its mounting plate by passing through the hole in the block (lodged against the battery on the mounting plate in a position to hold it in place) and through a hole in the mounting plate so that its threaded bottom end provides a means by which a nut can be screwed up against the bottom of the mounting plate.

Once the female portion of the locking system is secured in place the male key portion can easily be stored in the trunk of the automobile, to be used in case of battery replacement or recharging. Thus, theft is prevented because the securing bolt can't be turned without the male head, and the head is recessed in the block of material which, created so hard that not any ordinary means can be used to break its connection with the plate without damaging the battery, provides a practical battery locking system.

DETAILED DESCRIPTION OF A PREFERRED EMBODIMENT OF THE INVENTION

Figure 1:
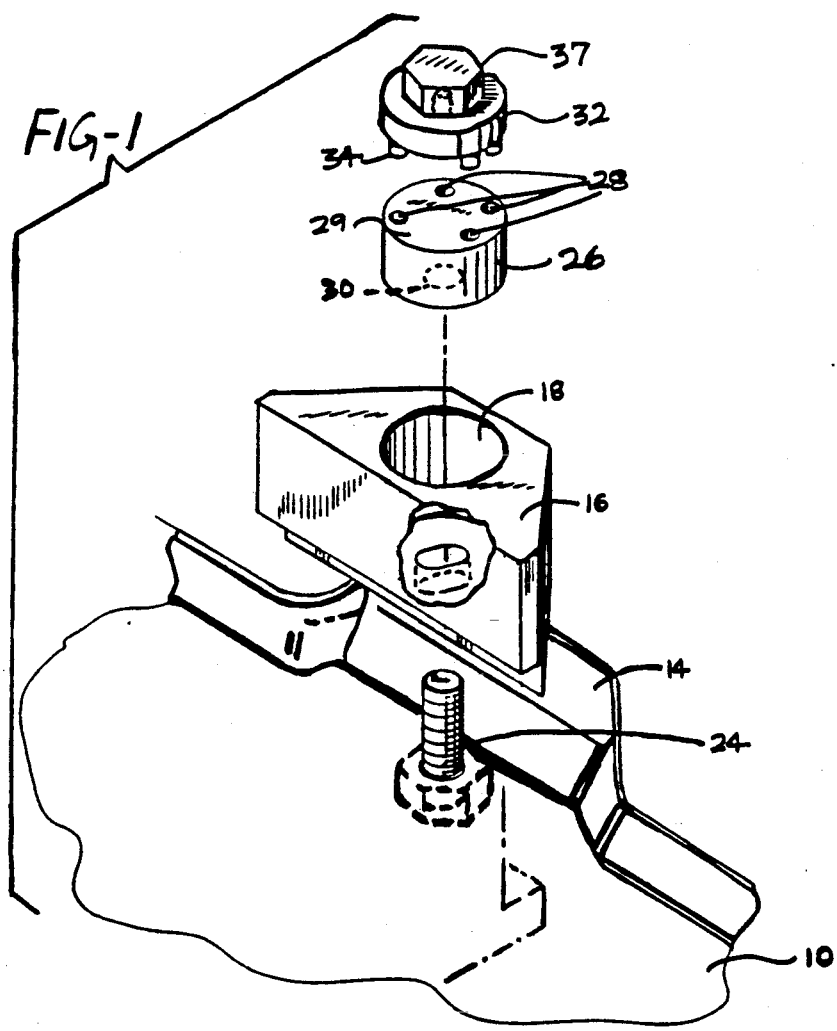
FIG. 1 is an exploded, isometric, fragmented view of operative parts of this invention showing part of a battery receiving plate as used on an automobile, an upwardly protruding securing bolt mounted therein, a raised battery lodging block over the bolt and the female head and male locking key, in turn, over the top.

Referring to the drawings a battery case support includes a flat plate 10 shaped to the size of the bottom of a battery 12 which is to be held therein.

The plate 10 is horizontally secured on a vehicle (not shown), usually in the engine compartment, so as to hold a battery 12 in a level, upright, position.

Secured to one side edge 14 of plate 10 is a block three to four inches high made of very hard material. This block 16 is formed with a safety hole 18 recessed down from its top 20 to extend about one and one-fourth inches deep so as to prevent use of a prying tool to force a bolt mounted therein out of position.

Figure 2:
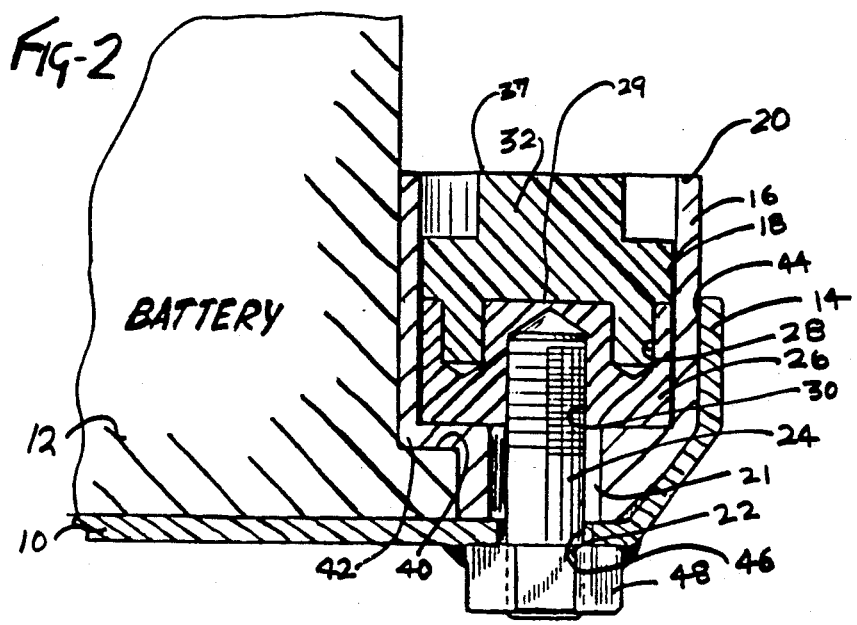
FIG. 2 is a fragmented, cross-sectional view taken with battery, this locking mechanism in position, securing bolt, and block lodged in position to hold a battery down tightly against a mounting plate.

Thus when the block 16 is placed in position, as in FIG. 2 it presses tightly against one side of the battery 12 and the other side against an upraised portion, the edge 44, of mounting plate. The other end of battery 12 is pressed tightly against securing structure on the opposite side of battery 12 and plate 10 (not shown) so as to hold it tightly in place.

The securing stud bolt 24 is locked into position by screwing it down into hole 18 so that its head 26 is recessed into it below the top surface thereof and it presses tightly against the block 16. Then the male turning piece 32 is removed and stored sothat the top of the bolt head cannot be turned by an ordinary wrench and it is protected from damage by the surrounding heavily hardened material of block 16.

Extending vertically down into hole 18 is a bottom bolt hole 20 adapted to receive the bottom, threaded end 22, of securing stud bolt 24.

A flat head 26, having variably spaced holes 28 (shown as four in number here) on its top 29, serves as the female receiving portion of the battery locking device.

In turn, head 26 has a bottom bolt receiving hole 30 which is matingly threaded to be screwed onto the upper threaded end of stud bolt 24.

A detachable male portion of the locking system includes a piece 32 which has prongs 34 extending down from the bottom 35 thereof which are spaced and sized to fit into the top holes 26 of the female portion head 26.

The top of piece 32 has a small, raised, hexagon-shaped turning head 37 which will fit a standard socket wrench so that, when matingly secured in the top holes 28 of female portion head 26, it can be used to securely tighten the stud bolt 24 to lock the battery in position.

In operation block 16 is specifically shaped and sized to hold a battery 12 securely mounted on the plate 10 of a battery support. Thus, in the embodiment shown herein where the battery 12 has outwardly extending lip 40 protruding from its bottom side edge, block 16 has a bottom edge recess 42 which is sized to matingly fit over lip 40 and press it firmly onto the top of plate 10.

The plate 10 is provided with an upwardly extending edge 44 and a bottom hole 46 sufficiently large to allow the bottom of bolt 24 to extend therethrough, but small enough that a securing nut 48 (that is matingly threaded with the bottom threaded end 22 of bolt 24) can press against the bottom of plate 10 when fitted onto bolt 24.

What is claimed is:

1. A device for locking a battery on a battery plate such as used in a vehicle:

including a battery plate for supporting a battery, said plate having a lip with a bolt hole therethrough extending laterally beyond a battery support portion thereof;

an attaching bolt mounted to extend upwardly through said bolt hole;

a locking block, made of material hard enough to resist penetration by common tools, formed with a block adapted to receive said attaching bolt therethrough, and shaped, when mounted on said battery plate with a battery held therein, to provide an impenetrable dislodging tool barrier between said battery plate and a battery mounted thereon; securing means for a battery mounted on said plate; said locking block provided with a recessed cavity, surrounding said block hole, said cavity extending partially down from the top of said locking block;

a securing nut adapted to engage said attaching bolt extending upwardly through said block hole, said nut shaped to matingly fit within said recessed cavity of said locking block and provided with locking means on the top thereof;

and a quickly detachable locking cap mountable within said recessed cavity in said locking block on top of and engageable with said securing nut so as to be able to tighten or loosen said nut and be removed to prevent unauthorized intrusion to the battery locking components.

2. A device for locking a battery on a battery plate as defined in claim 1 wherein said securing nut and detachable locking cap have mating male, female engaging means.

3. A device as defined in claim 2 wherein said securing nut is provided with special receptacles on the top thereof and said locking cap bottom is provided with protrusions mating with said receptacles on the top of said nut.

4. A device as defined in claim 3 wherein said receptacles on the top of said securing nut do not mate with conventional wrenches.

5. A device as defined in claim 4 wherein said locking cap can be disengaged quickly from said securing nut by lifting.

6. A device as defined in claim 5 wherein said locking cap is provided with means on the top thereof whereby it can be turned so as to cause rotation of a securing nut to which it is engaged.

7. A device as defined in claim 6 in combination with a battery supported in said battery plate wherein said locking block engages with said battery so as to hold it in place in said plate when locked.

8. A device as defined in claim 7 wherein said battery is formed with at least one lateral protrusion extending outwardly from its side and said lateral protrusion is engaged with said locking block when mounted on said plate.

9. A device as defined in claim 8 wherein said battery protrusion is an extending foot and said locking block is formed with a matching recessed portion which latches over said foot when engaged thereto.

* * * * *